United States Patent
Liu et al.

(10) Patent No.: US 11,447,153 B2
(45) Date of Patent: Sep. 20, 2022

(54) METHOD AND APPARATUS FOR ANNOTATING VIRTUAL LANE AT CROSSING

(71) Applicant: BEIJING BAIDU NETCOM SCIENCE TECHNOLOGY CO., LTD., Beijing (CN)

(72) Inventors: Yang Liu, Beijing (CN); Shiyu Song, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/339,016

(22) Filed: Jun. 4, 2021

(65) Prior Publication Data

US 2021/0291878 A1    Sep. 23, 2021

(30) Foreign Application Priority Data

Jul. 2, 2020    (CN) .......................... 202010626805.2

(51) Int. Cl.
 *B60W 60/00*    (2020.01)
(52) U.S. Cl.
 CPC .. *B60W 60/00272* (2020.02); *B60W 60/0011* (2020.02); *B60W 60/0017* (2020.02); *B60W 2552/53* (2020.02)
(58) Field of Classification Search
 None
 See application file for complete search history.

(56) References Cited

U.S. PATENT DOCUMENTS

| 2014/0278052 | A1 | 9/2014 | Slavin | |
|---|---|---|---|---|
| 2018/0203453 | A1 | 7/2018 | Hardy | |
| 2019/0219700 | A1* | 7/2019 | Coombe | G01S 7/4802 |
| 2020/0378788 | A1* | 12/2020 | Fujita | G09B 29/00 |
| 2021/0001877 | A1* | 1/2021 | Han | G08G 1/0112 |
| 2021/0096575 | A1* | 4/2021 | Xie | G06N 7/00 |

FOREIGN PATENT DOCUMENTS

| JP | 2016075905 A | 5/2016 |
|---|---|---|
| JP | 2020060552 A | 4/2020 |

OTHER PUBLICATIONS

Extended European Search Report of EP211779897.
First Office Action of the parallel application JP2021-060611.

* cited by examiner

*Primary Examiner* — Tamara L Weber
(74) *Attorney, Agent, or Firm* — J.C. Patents

(57) ABSTRACT

A method and apparatus for annotating a virtual lane at a crossing is provided, which relates to the field of intelligent transportation, and specifically includes: calculating a virtual connecting probability of various lanes that do not connected to each other at the crossing based on driving trajectory data of a vehicles that passing through the crossing within a detection time, and generating the virtual lane at the crossing for two disconnected lanes whose virtual connecting probability is greater than a threshold, and annotating the virtual lane on a map. In this process, the virtual lane at the crossing can be automatically generated according to the driving trajectory data of the vehicles passing through the crossing, and because the driving trajectory data of the vehicles passing through the crossing is real trajectory data, which is more in conformity with actual driving rules of the vehicles, and has a higher annotation accuracy.

14 Claims, 5 Drawing Sheets

METHOD AND APPARATUS FOR ANNOTATING VIRTUAL LANE AT CROSSING

CROSS-REFERENCE TO RELATED APPLICATION

This application claims priority to Chinese Patent Application No. 202010626805.2, filed on Jul. 2, 2020, the disclosure of which is hereby incorporated by reference in its entirety.

TECHNICAL FIELD

The present disclosure relates to intelligent transportation in the field of data processing technologies and, in particular, to a method and an apparatus for annotating a virtual lane at a crossing.

BACKGROUND

During an automatic driving process, an autonomous vehicle need to drive according to a path that has been planned in advance on a map, thereby the path may need to be accurate to a lane level, and lanes should be displayed on the map when the map is created.

The lanes should be annotated on an electrical map when creating the map. In which, the lanes include lanes contained in a regular road and lanes at a crossing, examples for the lanes at the crossing are lanes in a crossroad, such as an intersection, a T-junction and the like. For the lanes at the crossing, which are required to be in conformity with a driving habit of the human, and in conformity with an amount of lanes in practice. The lanes at the crossing are annotated in the map through an artificial annotation manner under normal conditions.

However, annotating the lanes at the crossing in the map though the artificial annotation manner has a low efficiency and is prone to make errors.

SUMMARY

Embodiments of the present application provide a method and an apparatus for annotating a virtual lane at a crossing, which is mean to solve a technical problem that, annotating lanes at the crossing in a map has a low efficiency and is prone to make errors in the prior art.

A first aspect of an embodiment of the present application provides a method for annotating a virtual lane at a crossing, includes:

acquiring driving trajectory data of vehicles that passing through the crossing within a detection time; calculating a virtual connecting probability of any two disconnected lanes at the crossing according to the driving trajectory data of the vehicles that passing through the crossing; the any two disconnected lanes are any two lanes that have no real lane line connected to each other; the virtual connecting probability of the any two disconnected lanes is a probability that the vehicles driving from one lane to the other between the any two disconnected lanes; aggregating driving trajectory data of two disconnected lanes whose virtual connecting probability is greater than a threshold when passing through the crossing, to generate the virtual lane at the crossing; and annotating the virtual lane on a map. In this process, the virtual lane at the crossing may be automatically generated according to the driving trajectory data of the vehicles that passing through the crossing, which has a higher efficiency comparing with an artificial annotation, and due to the driving trajectory data of the vehicles that passing through the crossing is real trajectory data, which can be more in conformity with actual driving rules of the vehicles, and an annotating accuracy is higher.

In a possible implementation, the calculating a virtual connecting probability of any two disconnected lanes at the crossing according to the driving trajectory data of the vehicles that passing through the crossing, includes: matching the driving trajectory data of the vehicles that passing through the crossing to a lane in the map, according to lane coordinate data of the map and the driving trajectory data of the vehicles that passing through the crossing; counting an amount of the driving trajectory data of the any two disconnected lanes at the crossing; and calculating the virtual connecting probability of the any two disconnected lanes at the crossing according to the amount of the driving trajectory data of the any two disconnected lanes at the crossing.

In a possible implementation, the calculating the virtual connecting probability of the any two disconnected lanes at the crossing according to the amount of the driving trajectory data of the any two disconnected lanes at the crossing, includes: calculating a ratio of the amount of the driving trajectory data of the any two disconnected lanes at the crossing to a total amount of the driving trajectory data to obtain the virtual connecting probability of the any two disconnected lanes at the crossing. Then the accurate and objective virtual connecting probability may be obtained.

In a possible implementation, the calculating a virtual connecting probability of any two disconnected lanes at the crossing according to the driving trajectory data of the vehicles that passing through the crossing, includes: performing a data cleaning for the driving trajectory data of the vehicles that passing through the crossing; and calculating the virtual connecting probability of the any two disconnected lanes at the crossing according to the cleaned driving trajectory data. Thereby an impact from noise data to an accuracy of the virtual connecting probability may be removed.

In a possible implementation, the performing a data cleaning for the driving trajectory data of the vehicles that passing through the crossing, includes: for any piece of the driving trajectory data of the vehicles that passing through the crossing, calculating a speed value of the vehicles between any two positions in the any piece of the driving trajectory data, and deleting data of the any two positions in case that the speed value of the vehicles between the any two positions is greater than a speed threshold. In such way, the data in the driving trajectory data that has unreasonable speed values may be removed.

In a possible implementation, the performing a data cleaning for the driving trajectory data of the vehicles that passing through the crossing, includes: for any piece of the driving trajectory data that passing through the crossing, deleting data in the any piece of the driving trajectory data that coordinates of which do not belong to a lane that is passable. Such that, the data does not in conformity with the traffic rules may be removed, and thereby the accurate driving trajectory data may be obtained.

In a possible implementation, the aggregating driving trajectory data of two disconnected lanes whose virtual connecting probability is greater than a threshold when passing through the crossing, to generate the virtual lane at the crossing, includes: aggregating the driving trajectory data of the two disconnected lanes whose virtual connecting probability is greater than the threshold when passing through the crossing, to obtain aggregated driving trajectory data; and performing a smoothing processing for the aggregated driving trajectory data with a vehicle dynamics smoothing algorithm to obtain the virtual lane at the crossing. The smoothing and accurate virtual lane may be obtained by performing a smoothing processing on the aggregated driving trajectory data with the vehicle dynamics smoothing algorithm.

In a possible implementation, the acquiring driving trajectory data of vehicles that passing through the crossing within a detection time, includes: acquiring data of other vehicles that collected by an autonomous vehicle when passing through the crossing within the detection time; and acquiring the driving trajectory data of the vehicles that passing through the crossing from the data. Such that, the driving trajectory data of the vehicles that passing through the crossing within the detection time may be collected by the autonomous vehicle.

A second aspect of an embodiment of the present application provides an apparatus for annotating a virtual lane at a crossing, includes:

a processing module, configured to acquire driving trajectory data of vehicles that passing through the crossing within a detection time;

the processing module is further configured to calculate a virtual connecting probability of any two disconnected lanes at the crossing according to the driving trajectory data of the vehicles that passing through the crossing; the any two disconnected lanes are any two lanes that have no real lane line connected to each other; the virtual connecting probability of the any two disconnected lanes is a probability that the vehicles driving from one lane to the other between the any two disconnected lanes;

the processing module is further configured to aggregate driving trajectory data of two disconnected lanes whose virtual connecting probability is greater than a threshold when passing through the crossing, to generate the virtual lane at the crossing;

the processing module is further configured to annotate the virtual lane on a map.

In a possible implementation, the processing module is specifically configured to:

match the driving trajectory data of the vehicles that passing through the crossing to a lane in the map according to lane coordinate data of the map and the driving trajectory data of the vehicles that passing through the crossing;

count an amount of the driving trajectory data of the any two disconnected lanes at the crossing; and calculate the virtual connecting probability of the any two disconnected lanes at the crossing according to the amount of the driving trajectory data of the any two disconnected lanes at the crossing.

In a possible implementation, the processing module is specifically configured to:

calculate a ratio of the amount of the driving trajectory data of the any two disconnected lanes at the crossing to a total amount of the driving trajectory data to obtain the virtual connecting probability of the any two disconnected lanes at the crossing.

In a possible implementation, the processing module is specifically configured to:

perform a data cleaning for the driving trajectory data of the vehicles that passing through the crossing; and calculate the virtual connecting probability of the any two disconnected lanes at the crossing according to the cleaned driving trajectory data.

In a possible implementation, the processing module is specifically configured to:

for any piece of the driving trajectory data that passing through the crossing, calculate a speed value of vehicles between any two positions in the any piece of the driving trajectory data, and deleting data of the any two positions in case that the speed value of the vehicles between the any two positions is greater than a speed threshold.

In a possible implementation, the processing module is specifically configured to:

for any piece of the driving trajectory data that passing through the crossing, delete data in the any one of the driving trajectory data that coordinates of which do not belong to a lane that is passable.

In a possible implementation, the processing module, specifically configured to:

aggregate the driving trajectory data of the two disconnected lanes whose virtual connecting probability is greater than the threshold when passing through the crossing, to obtain aggregated driving trajectory data; and perform a smoothing processing for the aggregated driving trajectory data with a vehicle dynamics smoothing algorithm to obtain the virtual lane at the crossing.

In a possible implementation, the processing module, specifically configured to:

acquire data of other vehicles that collected by an autonomous vehicle when passing through the crossing within the detection time; and acquire the driving trajectory data of the vehicles that passing through the crossing from the data.

A third aspect of an embodiment of the present application provides an electronic device, includes: at least one processor; and a memory communicatively connected with the at least one processor; where the memory stores instructions executable by the at least one processor, and the instructions are executed by the at least one processor to cause the at least one processor to execute the method according to any one of the first aspect.

A fourth aspect of an embodiment of the present application provides a non-transitory computer readable storage medium that stores computer instructions, the computer instructions are used to cause a computer to execute the method according to any one of the first aspect.

In a summary, advantageous effects of the present application compared with the prior art are that:

the method and apparatus for annotating the virtual lane at the crossing provided by the embodiments of the present application may calculate a virtual connecting probability of the lanes at the crossing that do not connected to each other according to the driving trajectory data of the vehicles that passing through the crossing within the detection time, generate the virtual lane at the crossing for the two disconnected lanes whose virtual connecting probability is greater than the threshold, and annotate the virtual lane on the map. In this process, the virtual lane at the crossing may be automatically generated according to the driving trajectory data of the vehicles that passing through the crossing, which has a higher efficiency comparing with an artificial annotation, and due to the driving trajectory data of the vehicles that passing through the crossing is real trajectory data, which can be more in conformity with actual driving rules of the vehicles, and an annotating accuracy is higher.

DESCRIPTION OF EMBODIMENTS

The following describes exemplary embodiments of the present application with reference to the accompanying drawings, which include various details of the embodiments of the present application to facilitate understanding, and these embodiments should be considered as merely exemplary. Therefore, those skilled in the art should recognize that various changes and modifications can be made to the embodiments described herein without departing from the scope and spirit of the present application. As well, for clarity and conciseness, descriptions of well-known functions and structures are omitted in the following description. In the case of no conflict, the following embodiments and features in the embodiments can be combined with each other.

A method for annotating a virtual lane at a crossing of an embodiment of the present application may be applied to a terminal or a server, and the terminal may include: mobile phones, tablet computers, notebook computers or desktop computers and other electronic devices. The embodiment of the present application does not specifically limit the specific equipment applied.

A crossing described in the embodiment of the present application may be a crossroad, a T-shaped crossing or a Y-shaped crossing and the like, which is not specifically limited in the embodiment of the present application.

Vehicles described in the embodiment of the present application may be autonomous vehicles, or vehicles driven by human with an auxiliary driving function, and the vehicles may specifically include cars, off-road vehicles, trucks and the like, which are not specifically limited in the embodiment of the present application.

Any two disconnected lanes described in the embodiment of the present application are any two lanes at a crossing that have no real lane line connected to each other.

A virtual connecting probability of any two disconnected lanes described in the embodiment of the present application is a probability of vehicles driving from one lane to the other between the any two disconnected lanes.

A map described in the embodiment of the present application may be a map used to assist driving of an autonomous vehicle, and may also be called as a high-accuracy map or a high-precision map. The map described in the embodiment of the present application is a map with higher accuracy compared to a traditional two-dimensional navigation map. For example, the accuracy reaches a decimeter level or even a centimeter level. The high-accuracy map may include various road information, such as lane types, road signs, traffic signs, speed limit information, road inclines, curves and the like, which is not specifically limited in the embodiment of the present application.

Figure 1:
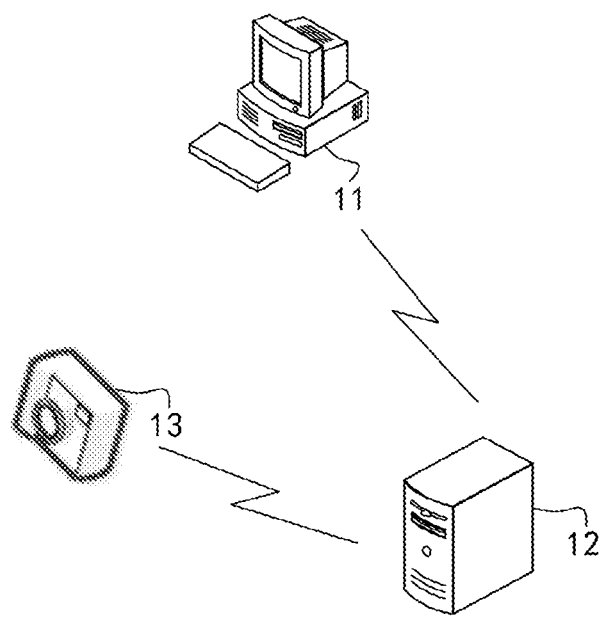
FIG. 1 is a schematic diagram of a system architecture applicable to a method for annotating a virtual lane at a crossing provided by an embodiment of the present application.

As shown in FIG. 1, FIG. 1 is a schematic diagram of a system architecture applicable to a method provided by an embodiment of the present application.

A network connection may be established between a terminal device 11 and a server 12, the network connection may be established between a vehicle-mounted device 13 and the server 12, and the vehicle-mounted device 13 is configured to collect driving data of a vehicle and send it to the server 12. The terminal device 11 can acquire driving data of a large number of vehicles through the server 12. In which, the driving data includes driving trajectories of the vehicles and the like. In an actual implementation, the vehicle-mounted device 13 may be set to collect driving data of all vehicles passing through a crossing within a period of time.

Exemplarily, a lane annotating personal may load and display lanes at the crossing on the terminal device 11 by operating the terminal device 11. The terminal device 11 may acquire driving trajectory data of the vehicles that passing through the crossing within a detection time from the server 12, calculate virtual connecting probabilities of various lanes that do not connected to each other in the crossing, and generate a virtual lane at the crossing for two disconnected lanes whose virtual connecting probability is greater than a threshold, and annotate the virtual lane on a map. In this process, the virtual lane at the crossing may be automatically generated according to the driving trajectory data of the vehicles that passing through the crossing, which has a higher efficiency comparing with an artificial annotation, and due to the driving trajectory data of the vehicles that passing through the crossing is real trajectory data, which can be more in conformity with actual driving rules of the vehicles, and an annotating accuracy is higher.

Figure 2:
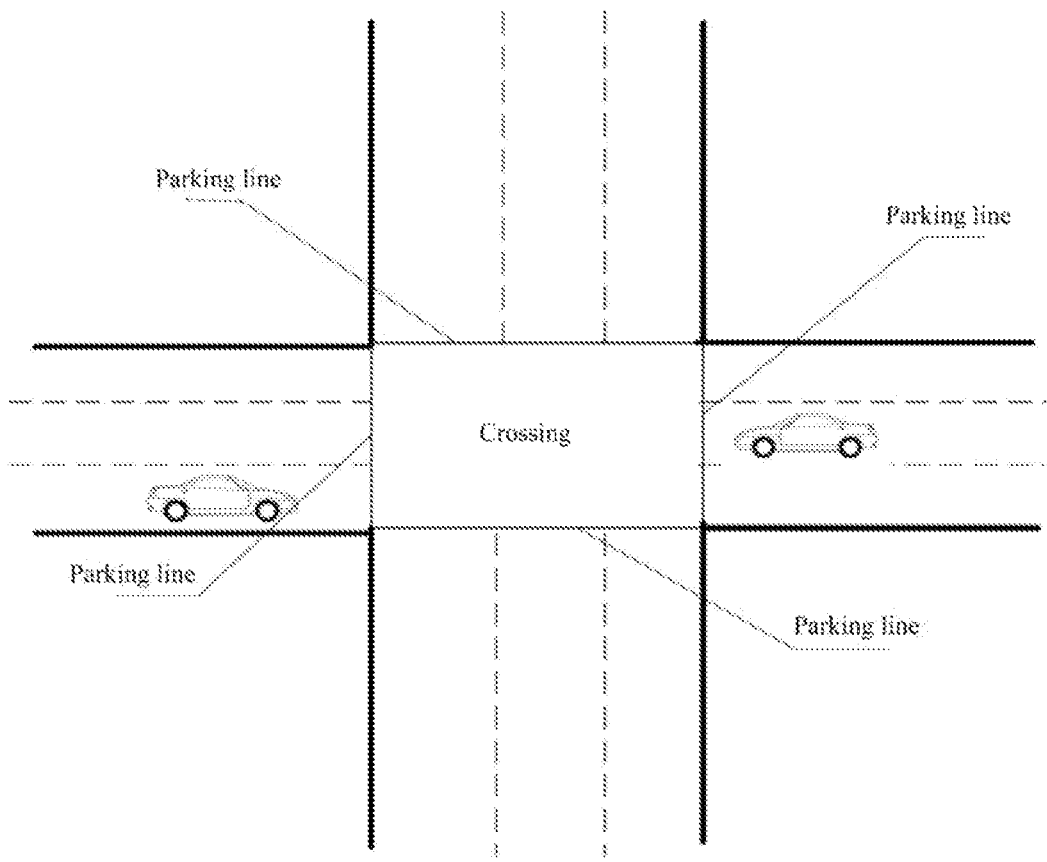
FIG. 2 is a schematic diagram of a crossing provided by an embodiment of the present application.

Exemplarily, FIG. 2 is a schematic diagram of a crossing applicable to a method provided by an embodiment of the present application.

Referring to FIG. 2, taking a crossroad as an example, a thick black solid line is a side of a road, a thin solid line is a parking line, a dashed line is a lane line in the road, and a rectangular area enclosed by parking lines in different directions at the crossroad is an area inside the crossroad. For a lane on the road, a traffic opening means that there are paint and other substance on a lane line of the lanes, so that a reflection intensity of a point on the lane line is not the same with which of a point on a ground that is not located in a lane position. Therefore, the lane line may be extracted through laser point cloud data, and the lane may be annotated on the high-accuracy map according to the lane line.

However, the lanes at the crossing are not usually highlighted with the paint, therefore, it is impossible to extract lane lines at the crossing according to laser point cloud data and annotate the virtual lane on the map. In the embodiment of the present application, a lane line annotated on the map is called as a virtual lane.

Figure 3:
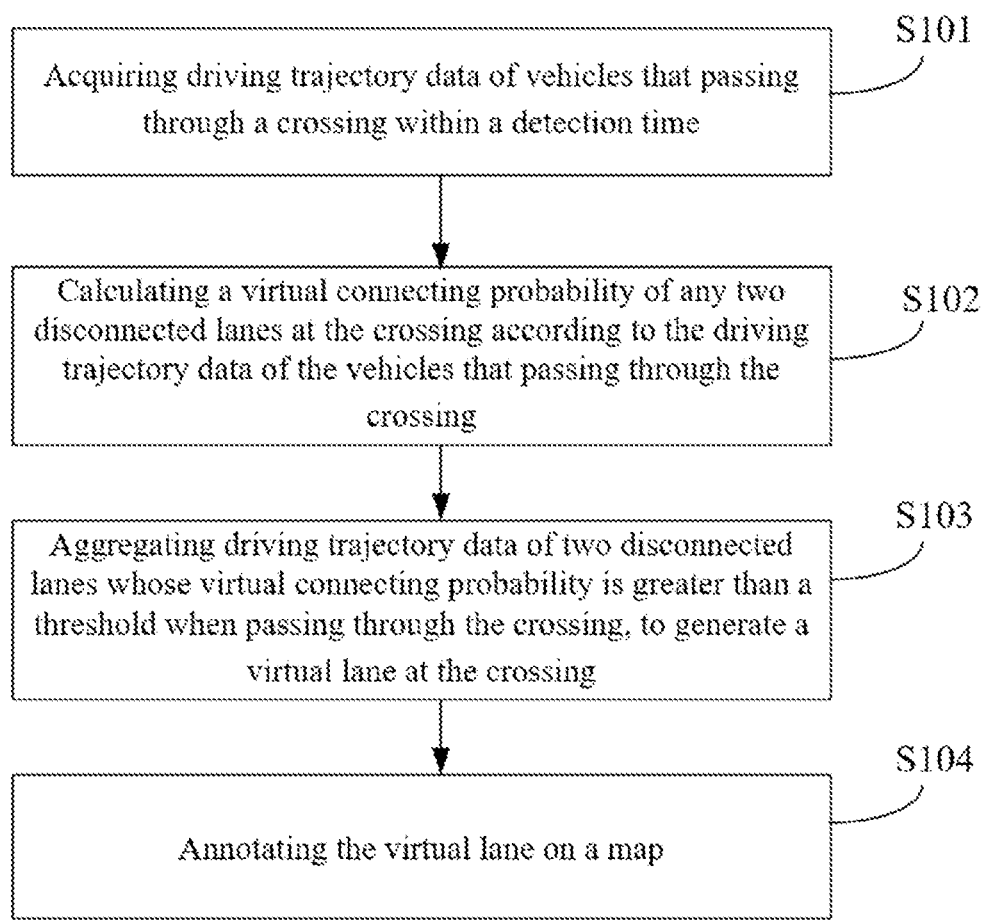
FIG. 3 is a schematic flowchart of a method for annotating a virtual lane at a crossing provided by an embodiment of the present application.

As shown in FIG. 3, FIG. 3 is a schematic flowchart of a method for annotating a virtual lane at a crossing provided by an embodiment of the present application. The method may specifically include:

S101: acquiring driving trajectory data of vehicles that passing through a crossing within a detection time.

In the embodiment of the present application, the detection time may be determined according to actual application scenarios, for example, it may be one day, one week, one month or one year and the like, which is not specifically limited in the embodiment of the present application.

In the embodiment of the present application, the driving trajectory data of the vehicles passing through the crossing may be driving trajectory data of multiple vehicles that passing through the crossing. For example, each vehicle may correspond to one piece of driving trajectory data, and the driving trajectory data may be a set of position coordinates of this vehicle when driving at the crossing.

In a possible implementation, the vehicles passing through the crossing may be vehicles driven by human drivers (or called as social vehicles), so that the virtual lane at the crossing may be generated according to human driving experience data, thereby realizing an anthropomorphism of an autonomous driving behavior.

S102: calculating a virtual connecting probability of any two disconnected lanes at the crossing according to the driving trajectory data of the vehicles passing through the crossing; the any two disconnected lanes are any two disconnected lanes at the crossing that have no real lane line connected to each other; the virtual connecting probability of the any two disconnected lanes is a probability of vehicles driving from one lane to the other between the any two disconnected lanes.

In the embodiment of the present application, the any two disconnected lanes are any two lanes at the crossing that have no real lane line connected to each other. Exemplarily, in a crossroad shown in FIG. 4, in lanes on the east, west, south, and north sides of the crossroad, the lanes on any two sides are have no real lane line connected to each other at the crossing, then any two lanes of the any two sides in the lanes on the east, west, south, and north sides at the crossing can be called as disconnected lanes.

In the embodiment of the present application, the virtual connecting probability of the any two disconnected lanes is the probability of the vehicles driving from one lane to the other in the any two disconnected lanes. Exemplarily, in the crossroad shown in FIG. 4, a probability that the vehicles driving from lane 1 to lane 2 is a virtual connecting probability of lane 1 and lane 2 that are disconnected to each other, and a probability that the vehicles driving from lane 1 to lane 3 is a virtual connecting probability of lane 1 and lane 3 that are disconnected to each other, the specific lane from which the vehicles driving to which lane may be indicated by the driving trajectory data of the vehicles.

In the embodiment of the present application, after acquiring the driving trajectory data of the vehicles that passing through the crossing, the virtual connecting probability of the any two disconnected lanes at the crossing may be calculated in any manner, which is not specifically limited in the embodiment of the present application.

S103: aggregating driving trajectory data of two disconnected lanes whose virtual connecting probability is greater than a threshold when passing through the crossing, to generate the virtual lane at the crossing.

In the embodiment of the present application, the threshold may be determined according to actual application scenarios, and which is not specifically limited in the embodiment of the present application. If the virtual connecting probability of the two disconnected lanes is greater than the threshold, it can indicate that the vehicles are usually driving from one of the two disconnected lanes to the other when passing through the crossing. Then, the virtual lane at the crossing may be generated by aggregating the driving trajectory data of the two disconnected lanes whose virtual connecting probability is greater than the threshold when the vehicles are passing through the crossing.

Figure 4:
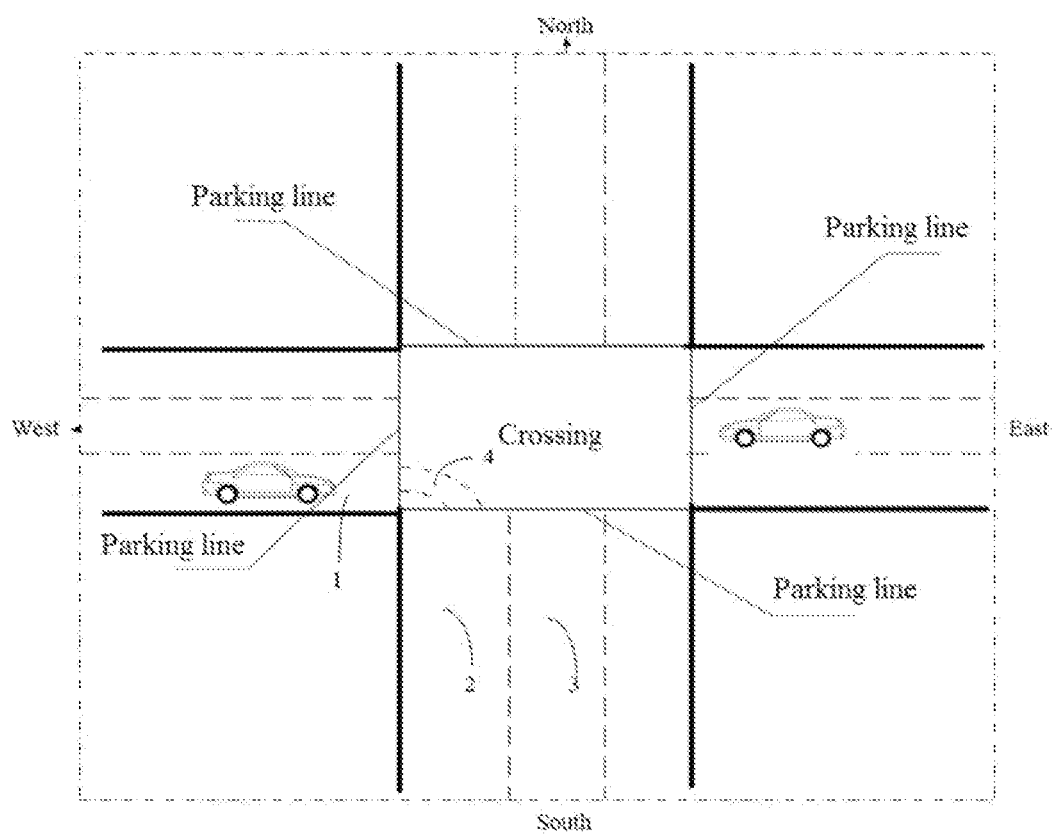
FIG. 4 is a schematic diagram of another crossing provided by an embodiment of the present application.

Exemplarily, in the crossroad shown in FIG. 4, the virtual connecting probability of lane 1 and lane 2 that are disconnected to each other is greater than the threshold, and a virtual lane 4 (the middle part of the dot-dash line) may be generated by aggregating the driving trajectory data of the vehicles driving from lane 1 to lane 2 via the crossing.

It can be understood that in practical applications, there may be multiple pairs of disconnected lanes whose virtual connecting probability is greater than the threshold, and driving trajectory data of each pair of the disconnected lanes when passing through the crossing may be aggregated separately to obtain a virtual lane of each pair of the disconnected lanes corresponding to the crossing.

It should be noted that in the crossroad, an amount of the lanes on both sides of the crossing may be inconsistent, for example, the amount of the lanes on the west side of the crossing may be 4, and the amount of the lanes on the east side of the crossing may be 3, and the amount of the lanes at the crossing is not specifically limited in the embodiment of the present application. Any kind of crossing may be applied to the method of the embodiments of the present application.

S104: annotating the virtual lane on a map.

In the embodiment of the present application, after generating the virtual lane at the crossing, the virtual lane may be annotated on the map. Furthermore, the autonomous vehicle may subsequently pass the crossing smoothly according to the virtual lane at the crossing that annotated on the map.

It can be understood that, since different types of vehicles have different lengths, heights and the like, trajectories applicable to the different types of the vehicles when passing through the crossing are different. Therefore, in a possible implementation of the embodiment of the present application, when annotating the virtual lane on the map, for one vehicle type, it may annotate a virtual lane on the map for this vehicle type every time, so that the accurate and suitable virtual lanes may be annotated for various types of vehicles.

For example, the method of the embodiment of the present application may be used to separately acquire the driving trajectory data of the vehicles passing through the crossing, thereby annotating the virtual lane of the vehicles passing through the crossroad on the map.

For another example, the method of the embodiment of the present application may be used to separately acquire the driving trajectory data of the truck passing through the crossing, thereby annotating the virtual lane of the truck passing through the crossing on the map, which is not specifically limited in the embodiment of the present application.

Adaptively, the virtual lane and the vehicle type may have a one-to-one correspondence.

In summary, the embodiments of the present application provide the method for annotating the virtual lane at the crossing, which may calculate the virtual connecting probabilities of various disconnected lanes at the crossing according to the driving trajectory data of the vehicles passing through the crossing within the detection time, and generate the virtual lane at the crossing for the two disconnected lanes whose virtual connecting probability is greater than the threshold, and annotate the virtual lane on the map. In this process, the virtual lane at the crossing may be automatically generated according to the driving trajectory data of the vehicles that passing through the crossing, which has a higher efficiency comparing with an artificial annotation, and due to the driving trajectory data of the vehicles that passing through the crossing is real trajectory data, which can be more in conformity with actual driving rules of the vehicles, and an annotating accuracy is higher.

On the basis of the embodiment corresponding to FIG. 3, in a possible implementation, the calculating the virtual connecting probability of any two disconnected lanes at the crossing according to the driving trajectory data of the vehicles that passing through the crossing, includes: matching the driving trajectory data of the vehicles passing through the crossing to a lane in the map according to lane coordinate data of the map and the driving trajectory data of the vehicles that passing through the crossing; counting an amount of the driving trajectory data of the any two disconnected lanes at the crossing; and calculating the virtual connecting probability of the any two disconnected lanes at the crossing according to the amount of the driving trajectory data of the any two disconnected lanes at the crossing.

In the embodiment of the present application, the lane of driving trajectory data of the vehicles is firstly matched according to the lane coordinate data of the map, then the mount of the driving trajectory data of the any two disconnected lanes at the crossing is counted, and then the virtual connecting probability of the any two disconnected lanes is calculated according to the amount of the driving trajectory data of the any two disconnected lanes by adopting any possible algorithms.

Exemplarily, a ratio of the amount of the driving trajectory data of the any two disconnected lanes at the crossing to a total amount of the driving trajectory data may be calculated to obtain the virtual connecting probability of the any two disconnected lanes at the crossing. In this way, an accurate and objective virtual connecting probability can be obtained.

On the basis of the embodiment corresponding to FIG. 3, in a possible implementation, the calculating the virtual connecting probability of the any two disconnected lanes at the crossing according to the driving trajectory data of the vehicles passing through the crossing, includes: performing a data cleaning on the driving trajectory data of the vehicles passing through the crossing; and calculating the virtual connecting probability of the any two disconnected lanes at the crossing according to the cleaned driving trajectory data.

In the embodiment of the present application, the data cleaning for the driving trajectory data of the vehicles is performed before calculating the virtual connecting probability of the any two disconnected lanes, which may remove an influence of noise data on the accuracy of the virtual connecting probability.

In a possible implementation, for any piece of the driving trajectory data passing through the crossing, a speed value of vehicles between any two positions in the any piece of the driving trajectory data is calculated, and data of the any two positions is deleted in the case that the speed value of the vehicles between the any two positions is greater than a speed threshold. In the embodiment of the present application, data with unreasonable speed values in the driving trajectory data may be removed, and the speed threshold may be set according to actual conditions, which is not specifically limited in the embodiment of the present application. Therefore, the accurate driving trajectory data may be obtained.

In a possible implementation, for the any piece of the driving trajectory data passing through the crossing, data of the any piece of the driving trajectory data that coordinates of which do not belong to a lane that is passable is deleted. In the embodiment of the present application, the data that does not in conformity with traffic rules can be removed from the driving trajectory data, so that the accurate driving trajectory data may be obtained.

On the basis of the embodiment corresponding to FIG. 3, in a possible implementation, the aggregating the driving trajectory data of the two disconnected lanes whose virtual connecting probability is greater than the threshold when passing through the crossing, to generate the virtual lane at the crossing, includes: aggregating the driving trajectory data of the two disconnected lanes whose virtual connecting probability is greater than the threshold when passing through the crossing to obtain aggregated driving trajectory data; and performing a smoothing processing for the aggregated driving trajectory data with a vehicle dynamics smoothing algorithm to obtain the virtual lane at the crossing.

In the embodiment of the present application, the vehicle dynamics smoothing algorithm is a general trajectory processing algorithm, which will not elaborate herein. A smooth and accurate virtual lane may be obtained by performing the smoothing processing for the aggregated driving trajectory data with the vehicle dynamics smoothing algorithm.

On the basis of the embodiment corresponding to FIG. 3, in a possible implementation, the acquiring the driving trajectory data of the vehicles passing through the crossing within the detection time, includes: acquiring data of other vehicles collected by an autonomous vehicle when passing through the crossing within the detection time; and acquiring the driving trajectory data of the vehicles passing through the crossing from the data.

In the embodiment of the present application, the autonomous vehicle may be used to automatically collect the driving trajectory data of the vehicles passing through the crossing within the detection time. For example, when the autonomous vehicle is driving on the road, it can sense dynamic objects in real time, and the dynamic objects may be vehicles, pedestrians and the like. The autonomous vehicle may classify the dynamic objects and locate surrounding vehicles, then positions, shapes, orientations, speeds and the like of the surrounding vehicles may be collected once every few millisecond, for the same vehicle, position data can be connected to form a trajectory of this vehicle.

In a specific implementation, a storage device may be set on the autonomous vehicle, and information collected by the autonomous vehicle may be stored in the storage device. When the autonomous vehicle returns every day, the storage device may be removed, and then the data of other vehicles stored in the storage device may be acquired offline, from which the driving trajectory data of the vehicles passing through the crossing may be acquired.

In the embodiment of the present application, when the autonomous vehicle is driving on the road, the surrounding vehicles may be considered as vehicles driven by human drivers. Therefore, in the embodiment of the present application, when calculating the virtual lane, a trajectory that in conformity with the driving habits of the human drivers is referred to. Compared with usual virtual lanes generated based on a manual annotation or curve algorithms, which is not in conformity with the driving habits of the human drivers, for example, when turning left, virtual connecting lanes generated based on the manual annotation or the curve algorithms tend to be closer to a center of the crossing, while the human drivers tend to be closer to an edge of the road, which results in the autonomous vehicles being cut off by social vehicles, and cannot achieve a crossing driving well. The virtual lane in the embodiment of the present application can help the autonomous vehicle to pass through the crossing in a manner in conformity with the human driving habits.

Figure 5:
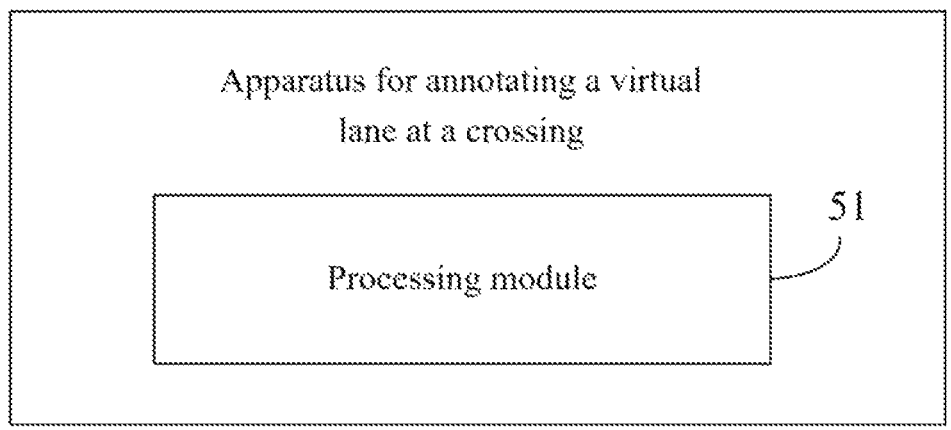
FIG. 5 is a schematic structural diagram of an apparatus for annotating a virtual lane at a crossing provided by an embodiment of the present application.

FIG. 5 is a schematic structural diagram of an embodiment of an apparatus for annotating a virtual lane at a crossing provided by the present application. As shown in FIG. 5, the apparatus for annotating the virtual lane at the crossing provided by the present embodiment includes:

a processing module 51, configured to acquire driving trajectory data of vehicles that pass through the crossing within a detection time;

the processing module 51 is further configured to calculate a virtual connecting probability of any two disconnected lanes at the crossing according to the driving trajectory data of the vehicles that passing through the crossing; the any two disconnected lanes are any two lanes that have no real lane line connected to each other; the virtual connecting probability of the any two disconnected lanes is a probability that vehicles driving from one lane to the other between the any two disconnected lanes;

the processing module 51 is further configured to aggregate driving trajectory data of two disconnected lanes whose virtual connecting probability is greater than a threshold when passing through the crossing to generate the virtual lane at the crossing;

the processing module is further configured to annotate the virtual lane on a map.

In a possible implementation, the processing module is specifically configured to:

match the driving trajectory data of the vehicles that passing through the crossing to a lane in the map according to lane coordinate data of the map and the driving trajectory data of the vehicles that passing through the crossing;

count an amount of the driving trajectory data of the any two disconnected lanes at the crossing; and calculate the virtual connecting probability of the any two disconnected lanes at the crossing according to the amount of the driving trajectory data of the any two disconnected lanes at the crossing.

In a possible implementation, the processing module is specifically configure to:

calculate a ratio of the amount of the driving trajectory data of the any two disconnected lanes at the crossing to a total amount of the driving trajectory data to obtain the virtual connecting probability of the any two disconnected lanes at the crossing.

In a possible implementation, the processing module is further specifically configured to:

perform a data cleaning for the driving trajectory data of the vehicles that passing through the crossing;

calculate the virtual connecting probability of the any two disconnected lanes at the crossing according to the cleaned driving trajectory data.

In a possible implementation, the processing module is further specifically configured to:

for any piece of the driving trajectory data of the vehicles that passing through the crossing, calculate a speed value of vehicles between any two positions in the any piece of the driving trajectory data, and deleting data of the any two positions in case that the speed value of the vehicles between the any two positions is greater than a speed threshold.

In a possible implementation, the processing module is further specifically configured to:

for any piece of the driving trajectory data that passing through the crossing, delete data of the any piece of the driving trajectory data that coordinates of which do not belong to a lane that is passable.

In a possible implementation, the processing module is further specifically configured to:

aggregate the driving trajectory data of the two disconnected lanes whose virtual connecting probability is greater than the threshold when passing through the crossing, to obtain aggregated driving trajectory data; and perform a smoothing processing for the aggregated driving trajectory data with a vehicle dynamics smoothing algorithm to obtain the virtual lane at the crossing.

In a possible implementation, the processing module is specifically configured to:

acquire data of other vehicles that collected by an autonomous vehicle when passing through the crossing within the detection time;

acquire the driving trajectory data of the vehicles that pass through the crossing from the data.

The embodiment of the present application provides an apparatus for annotating the virtual lane at the crossing, which may calculate the virtual connecting probability of the lanes that do not connected to each other at the crossing according to the driving trajectory data of the vehicles passing through the crossing within the detection time, and generate the virtual lane at the crossing for the two disconnected lanes whose virtual connecting probability is greater than the threshold, and annotate the virtual lane on the map. In this process, the virtual lane at the crossing may be automatically generated according to the driving trajectory data of the vehicles that passing through the crossing, which has a higher efficiency comparing with an artificial annotation, and due to the driving trajectory data of the vehicles that passing through the crossing is real trajectory data, which can be more in conformity with actual driving rules of the vehicles, so that the annotation has a higher accuracy.

The apparatus for annotating the virtual lane at the crossing provided by each embodiment of the present application may be used to execute the method shown in each of the foregoing corresponding embodiments, and the implementation and principles of which are the same, and will not be elaborate herein.

According to the embodiment of the present application, the present application also provides an electronic device and a readable storage medium.

Figure 6:
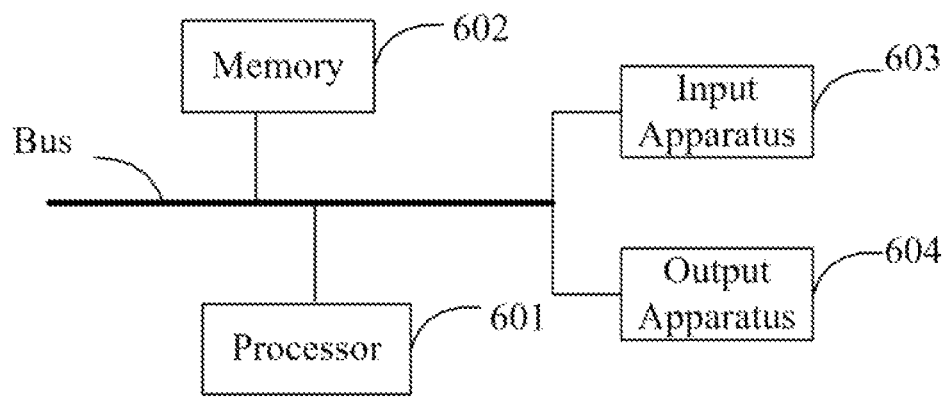
FIG. 6 is a block diagram of an electronic device used to implement a method for annotating a virtual lane at a crossing of an embodiment of the present application.

As shown in FIG. 6, which is a block diagram of an electronic device according to a method for annotating a virtual lane at a crossing. The electronic device is intended to represent various forms of digital computers, such as laptop computers, desktop computers, workbenches, personal digital assistants, servers, blade servers, mainframe computers, and other suitable computers. The electronic device can also represent various forms of mobile devices, such as personal digital processing, cellular phones, smart phones, wearable devices, and other similar computing devices. The components shown here, their connections and relationships, and their functions are merely examples, and are not intended to limit the implementation of the application described and/or claimed herein.

As shown in FIG. 6, the electronic device includes one or more processors 601, a memory 602, and interfaces for connecting various components, including a high-speed interface and a low-speed interface. The various components are connected to each other using different buses and may be installed on a common motherboard or installed in other ways as required. The processor may process instructions executed within the electronic device, including instructions stored in or on the memory to display graphical information of Graphical User Interface (GUI) on an external input/output device (such as a display device coupled to the interface). In other implementation, multiple processors and/or multiple buses may be used with multiple memories if required. Similarly, multiple electronic devices may be connected, and each device provides some necessary operations (for example, as a server array, a group of blade servers, or a multi-processor system). In FIG. 6, the processor 601 is taken as an example.

The memory 602 is a non-transitory computer-readable storage medium provided by the present application. Where, the memory stores instructions executable by at least one processor, so that the at least one processor executes the method for annotating the virtual lane at the crossing provided by the present application. The non-transitory computer-readable storage medium of the present application stores computer instructions, the computer instructions are used to cause the computer to execute the method for annotating the virtual lane at the crossing provided by the present application.

The memory 602 may be used to store non-transitory software programs, non-transitory computer executable programs and modules, such as program instructions/modules corresponding to the method for annotating the virtual lane at the crossing in the embodiment of the present application (For example, the processing module 51 shown in FIG. 5) as the non-transitory computer-readable storage medium. The processor 601 may execute various functional applications and data processing of the server by executing the non-transitory software programs, instructions and modules stored in the memory 602, that is, implement the method for annotating the virtual lane at the crossing in the above method embodiment.

The memory 602 may include a storage program area and a storage data area, where the storage program area may store an operating system and the application program required by least one function; the storage data area may store data created according to the use of the electronic device for annotating the virtual lane at the crossing and the like. In addition, the memory 602 may include a high-speed random access memory, and may also include a non-transitory memory, such as at least one magnetic disk storage device, a flash memory device, or other non-transitory solid-state storage devices. In some embodiments, the memory 602 may include memories that are remotely set relative to the processor 601, and these remote memories may be connected to the electronic device for annotating the virtual lane at the crossing through a network. Examples of the above networks include but are not limited to the Internet, intranet, local area network, mobile communication network, and combinations thereof.

The electronic device of the method for annotating the virtual lane at the crossing may further include an input apparatus 603 and an output apparatus 604. The processor 601, the memory 602, the input apparatus 603, and the output apparatus 604 may be connected through a bus or in other ways, connecting through the bus is taken as an example In FIG. 6.

The input apparatus 603 can receive digital or character information that input, and generate key signal inputs related to user settings and function controlling of the electronic devices for annotating a virtual lane at the crossing, such as touch screen, keypad, mouse, trackpad, touchpad, pointing stick, one or more mouse buttons, trackball, joystick and other input device. The output apparatus 604 may include a display device, an auxiliary lighting apparatus (for example, LED), a tactile feedback apparatus (for example, a vibration motor) and the like. The display device may include but is not limited to a liquid crystal display (LCD), a light emitting diode (LED) display and a plasma display. In some embodiments, the display device may be the touch screen.

Various implementations of the systems and techniques described herein may be implemented in digital electronic circuit systems, integrated circuit systems, application specific integrated circuits (ASICs), computer hardware, firmware, software and/or combinations thereof. These various implementations can include: implementing in one or more computer programs, the one or more computer programs may be executed and/or interpreted on a programmable system that includes at least one programmable processor, the programmable processor may be a dedicated or general-purpose programmable processor, which may receive data and instructions from a storage system, at least one input device and at least one output device, and transmit the data and instructions to the storage system, the at least one input device and the at least one output device.

These computer programs (also called programs, software, software applications or codes) include machine instructions of the programmable processor, and these computer programs may be implemented using high-level process and/or object-oriented programming languages, and/or assembly/machine languages. As used herein, the terms "machine-readable medium" and "computer-readable medium" refer to any computer program product, device and/or apparatus (for example, magnetic disks, optical disks, memory, programmable logic devices (PLD)) used to provide machine instructions and/or data to the programmable processor, which including the machine-readable media that receives machine instructions as machine-readable signals. The term "machine-readable signal" refers to any signal used to provide the machine instructions and/or the data to the programmable processor.

In order to provide interaction with a user, the system and technology described herein may be implemented on a computer, the computer has the display apparatus (for example, a cathode ray tube (CRT) or a liquid crystal display (LCD) monitor) used for displaying information to the user, as well as the keyboard and pointing apparatus (for example, mouse or trackball), the user may provide input to the computer through the keyboard and the pointing apparatus. Other kinds of apparatus may also be used to provide interaction with the user; for example, a feedback provided to the user can be any form of the sensory feedback (for example, visual feedback, auditory feedback or tactile feedback); and may receive input from the user in any forms (including acoustic input, voice input or tactile input).

The systems and techniques described herein may be implemented in a computing system that including back-end components (for example, as a data server), or the computing system that including middleware components (for example, application servers), or the computing system that including front-end components (for example, a user computer with a graphical user interface or a web browser, through which the user may interact with the implementation of the systems and technologies described herein), or the computing system including any combinations of such back-end components, middleware components or any front-end components. The components of the system can be interconnected by any form or medium of a digital data communication (for example, a communication network). Examples of the communication networks include: the local area network (LAN), the wide area network (WAN) and the Internet.

The computing system may include a client and a server. The client and the server are generally far from each other and usually interact through the communication network. A relationship between the client and the server is generated by running the computer programs with a client-server relationship on corresponding computers.

According to the technical solution of the embodiment of the present application, the virtual connecting probability of lanes do not connected to each other at the crossing may be calculated according to the driving trajectory data of the vehicles passing through the crossing within the detection time, and the virtual lanes at the crossing may be generated for the two disconnected lanes whose virtual connecting probability is greater than the threshold, and the virtual lane may be annotated on the map. In this process, the virtual lane at the crossing may be automatically generated according to the driving trajectory data of the vehicles passing through the crossing, which is more efficient than the manual annotation, and because the driving trajectory data of the vehicles passing through the crossing is real trajectory data, which is more in conformity with actual driving rules of the vehicles, and has a higher annotation accuracy.

It should be understood that various forms of the processes shown above may be used to reorder, add, or delete steps. For example, the steps described in the present application may be executed in parallel, sequentially or in different orders, as long as the desired results of the technical solutions disclosed in this application can be achieved, which is not limited herein.

The above specific embodiments do not constitute a limitation on the protection scope of the present application. Those skilled in the art should understand that various modifications, combinations, sub-combinations and substitutions may be made according to design requirements and other factors. Any modifications, equivalent replacements and improvements made within the spirit and principle of the present application shall be included in the protection scope of the present application.

What is claimed is:

1. A method for annotating a virtual lane at a crossing, wherein the method comprises:
   acquiring, by a terminal device, driving trajectory data of vehicles driven by human drivers that passing through the crossing within a detection time from a sever, wherein the driving trajectory data is associated with an autonomous vehicle type;
   calculating, by the terminal device, a virtual connecting probability of any two disconnected lanes at the crossing according to the driving trajectory data of the vehicles that passing through the crossing; the any two disconnected lanes are any two lanes that have no real lane line connected to each other; the virtual connecting probability of the any two disconnected lanes is a probability that vehicles driving from one lane to the other between the any two disconnected lanes;
   aggregating, by the terminal device, driving trajectory data of two disconnected lanes whose virtual connecting probability is greater than a threshold when passing through the crossing, to generate the virtual lane for an autonomous vehicle passing at the crossing, wherein the virtual lane and the autonomous vehicle type have a one-to-one correspondence;
   annotating, by the terminal device, the virtual lane on an electronic map used to assist driving of the autonomous vehicle; and
   maneuvering, by the terminal device, the autonomous vehicle based on the electronic map;
   wherein the calculating, by the terminal device, a virtual connecting probability of any two disconnected lanes at the crossing according to the driving trajectory data of the vehicles that passing through the crossing, comprises:
   performing, by the terminal device, a data cleaning for the driving trajectory data of the vehicles that passing through the crossing; and
   calculating, by the terminal device, the virtual connecting probability of the any two disconnected lanes at the crossing according to the cleaned driving trajectory data;
   wherein the performing, by the terminal device, a data cleaning for the driving trajectory data of the vehicles that passing through the crossing, comprises:
   for any piece of the driving trajectory data that passing through the crossing, calculating, by the terminal device, a speed value of vehicles between any two positions in the any piece of the driving trajectory data, and deleting, by the terminal device, data of the any two positions in case that the speed value of the vehicles between the any two positions is greater than a speed threshold; or
   for any piece of the driving trajectory data that passing through the crossing, deleting, by the terminal device, data in the any piece of the driving trajectory data that coordinates of which do not belong to a lane that is passable.

2. The method according to claim 1, wherein the calculating, by the terminal device, a virtual connecting probability of any two disconnected lanes at the crossing according to the driving trajectory data of the vehicles that passing through the crossing, comprises:
   matching, by the terminal device, the driving trajectory data of the vehicles that passing through the crossing to a lane in the electronic map according to lane coordinate data of the electronic map and the driving trajectory data of the vehicles that passing through the crossing;
   counting, by the terminal device, an amount of the driving trajectory data of the any two disconnected lanes at the crossing; and
   calculating, by the terminal device, the virtual connecting probability of the any two disconnected lanes at the crossing according to the amount of the driving trajectory data of the any two disconnected lanes at the crossing.

3. The method according to claim 2, wherein the calculating, by the terminal device, the virtual connecting probability of the any two disconnected lanes at the crossing according to the amount of the driving trajectory data of the any two disconnected lanes at the crossing, comprises:
   calculating, by the terminal device, a ratio of the amount of the driving trajectory data of the any two disconnected lanes at the crossing to a total amount of the driving trajectory data to obtain the virtual connecting probability of the any two disconnected lanes at the crossing.

4. The method according to claim 3, wherein the acquiring, by the terminal device, driving trajectory data of vehicles that passing through the crossing within a detection time, comprises:

acquiring, by the terminal device, data of other vehicles that collected by the autonomous vehicle when passing through the crossing within the detection time; and acquiring, by the terminal device, the driving trajectory data of the vehicles that passing through the crossing from the data.

5. The method according to claim 2, wherein the acquiring driving trajectory data of vehicles that passing through the crossing within a detection time, comprises:

acquiring, by the terminal device, data of other vehicles that collected by the autonomous vehicle when passing through the crossing within the detection time; and acquiring, by the terminal device, the driving trajectory data of the vehicles that passing through the crossing from the data.

6. The method according to claim 1, wherein the aggregating, by the terminal device, driving trajectory data of two disconnected lanes whose virtual connecting probability is greater than a threshold when passing through the crossing, to generate the virtual lane at the crossing, comprises:

aggregating, by the terminal device, the driving trajectory data of the two disconnected lanes whose virtual connecting probability is greater than the threshold when passing through the crossing, to obtain aggregated driving trajectory data; and performing, by the terminal device, a smoothing processing for the aggregated driving trajectory data with a vehicle dynamics smoothing algorithm to obtain the virtual lane at the crossing.

7. The method according to claim 1, wherein the acquiring, by the terminal device, driving trajectory data of vehicles that passing through the crossing within a detection time, comprises:

acquiring, by the terminal device, data of other vehicles that collected by the autonomous vehicle when passing through the crossing within the detection time; and acquiring, by the terminal device, the driving trajectory data of the vehicles that passing through the crossing from the data.

8. An electronic device, comprising:

at least one processor; and a memory that communicatively connected with the at least one processor; wherein the memory stores instructions executable by the at least one processor, and the instructions are executed by the at least one processor to cause the at least one processor to execute the following steps:

acquiring driving trajectory data of vehicles driven by human drivers that passing through the crossing within a detection time from a sever, wherein the driving trajectory data is associated with an autonomous vehicle type;

calculating a virtual connecting probability of any two disconnected lanes at the crossing according to the driving trajectory data of the vehicles that passing through the crossing; the any two disconnected lanes are any two lanes that have no real lane line connected to each other; the virtual connecting probability of the any two disconnected lanes is a probability that vehicles driving from one lane to the other between the any two disconnected lanes;

aggregating driving trajectory data of two disconnected lanes whose virtual connecting probability is greater than a threshold when passing through the crossing, to generate the virtual lane for an autonomous vehicle passing at the crossing, wherein the virtual lane and the autonomous vehicle type have a one-to-one correspondence;

annotating the virtual lane on an electronic map used to assist driving of the autonomous vehicle; and maneuvering the autonomous vehicle based on the electronic map;

wherein the at least one processor is further configured to execute the following steps:

performing a data cleaning for the driving trajectory data of the vehicles that passing through the crossing; and calculating the virtual connecting probability of the any two disconnected lanes at the crossing according to the cleaned driving trajectory data;

wherein the at least one processor is further configured to execute one of the following steps:

for any piece of the driving trajectory data that passing through the crossing, calculating a speed value of vehicles between any two positions in the any piece of the driving trajectory data, and deleting data of the any two positions in case that the speed value of the vehicles between the any two positions is greater than a speed threshold; and for any piece of the driving trajectory data that passing through the crossing, deleting data in the any piece of the driving trajectory data that coordinates of which do not belong to a lane that is passable.

9. The electronic device according to claim 8, wherein the at least one processor is further configured to execute the following steps:

matching the driving trajectory data of the vehicles that passing through the crossing to a lane in the electronic map according to lane coordinate data of the electronic map and the driving trajectory data of the vehicles that passing through the crossing;

counting an amount of the driving trajectory data of the any two disconnected lanes at the crossing; and calculating the virtual connecting probability of the any two disconnected lanes at the crossing according to the amount of the driving trajectory data of the any two disconnected lanes at the crossing.

10. The electronic device according to claim 9, wherein the at least one processor is further configured to execute the following step:

calculating a ratio of the amount of the driving trajectory data of the any two disconnected lanes at the crossing to a total amount of the driving trajectory data to obtain the virtual connecting probability of the any two disconnected lanes at the crossing.

11. The electronic device according to claim 9, wherein the at least one processor is further configured to execute the following steps:

acquiring data of other vehicles that collected by the autonomous vehicle when passing through the crossing within the detection time; and acquiring the driving trajectory data of the vehicles that passing through the crossing from the data.

12. The electronic device according to claim 8, wherein the at least one processor is further configured to execute the following steps:

aggregating the driving trajectory data of the two disconnected lanes whose virtual connecting probability is greater than the threshold when passing through the crossing, to obtain aggregated driving trajectory data; and performing a smoothing processing for the aggregated driving trajectory data with a vehicle dynamics smoothing algorithm to obtain the virtual lane at the crossing.

13. The electronic device according to claim 8, wherein the at least one processor is further configured to execute the following steps:
- acquiring data of other vehicles that collected by the autonomous vehicle when passing through the crossing within the detection time; and
- acquiring the driving trajectory data of the vehicles that passing through the crossing from the data.

14. A non-transitory computer readable storage medium that stores computer instructions, wherein the computer instructions are used to cause a computer to execute the method according to claim 1.

\* \* \* \* \*